United States Patent [19]

Ellis et al.

[11] 4,091,280
[45] May 23, 1978

[54] FIBER OPTIC POSITION SENSING AND INDICATING APPARATUS FOR ELECTRICAL INTERFERENCE SENSITIVE ENVIRONMENTS

[75] Inventors: John R. Ellis, Chula Vista; Gary M. Holma; Donald B. Forman, both of San Diego, all of Calif.

[73] Assignee: The United States of America as represented by the Secretary of the Navy, Washington, D.C.

[21] Appl. No.: 723,009

[22] Filed: Sep. 13, 1976

[51] Int. Cl.² ............................................. G01D 5/34
[52] U.S. Cl. ................................ 250/231 R; 250/227; 250/231 P
[58] Field of Search ............. 250/231 SE, 231 R, 227, 250/221, 231 P; 356/205

[56] References Cited

U.S. PATENT DOCUMENTS

| | | | |
|---|---|---|---|
| 3,399,347 | 8/1968 | Martens | 250/231 SE X |
| 3,502,892 | 3/1970 | Brittain | 250/231 R |
| 3,771,325 | 11/1973 | Sweeney et al. | 250/227 X |
| 3,781,092 | 12/1973 | Sussman et al. | 250/227 X |
| 3,940,608 | 2/1976 | Kissinger et al. | 250/227 |
| 3,947,088 | 3/1976 | French | 250/227 X |
| 3,960,017 | 6/1976 | Romanowski | 250/231 X |

Primary Examiner—David C. Nelms
Assistant Examiner—Vincent J. Sunderdick
Attorney, Agent, or Firm—R. S. Sciascia; G. J. Rubens

[57] ABSTRACT

Apparatus is disclosed for remotely sensing the mechanical position of one or more objects in an electrical inferference sensitive environment, such as the landing gear of an aircraft of the like in which is utilized a passive, fiber optic transmission system having means for testing the continuity of the system to enhance safety and reliability.

2 Claims, 4 Drawing Figures

FIBER OPTIC POSITION SENSING AND INDICATING APPARATUS FOR ELECTRICAL INTERFERENCE SENSITIVE ENVIRONMENTS

BACKGROUND OF THE INVENTION

This invention relates to apparatus for sensing and displaying mechanical position information, and more particularly to such apparatus that utilizes a passive fiber optic transmission system with means for testing its continuity to enhance reliablitiy.

Previous systems for sensing the mechanical information of aircraft components, such as the relative positive of swing wings, landing gear, etc., utilized mechanically actuated switches and/or electromagnetic influenced proximity switches. These systems may be referred to as "active" systems in that they require transmission of electrical signals from the mechanical component to a remotely located electrical processor, which either converted the sensed mechanical condition provided by the electrical signal to a visible display, or else provided logic inputs to system control functions by computer processing of the logic inputs.

Both of these approaches required the use of electrical power and a suitable grounding system for proper operation, and, therefor, required extensive design constraints to prevent electromagnetic interferenc, radio frequency interference, and/or electromagnetic pulse interference, from adversely effecting their proper operation.

In addition mechanical acutated electrical switches are very susceptible to electrical point bounce, electrical contact resistance, and mechanical failure problems. Electromagnetic proximity switches usually contain integrated circuits which are relatively expensive, and will fail in extreme temperature environments frequently encountered in military aircraft flight operations.

SUMMARY OF THE INVENTION

A passive optical sensing system is provided that will enable the positioning of mechanical devices, such as on an aircraft, without requiring the transmission of electrical power, therefore avoiding the various electrical interference problems that may otherwise arise.

The invention may be called a passive data transmission system in that it employs only the transmission of light signals to and from the object or component being sensed. The system employs an optical switch having a pressure sensitive member engageable by the object or component in one of its operative positions. The pressure sensitive member has means for changing the degree of reflectivity of light directed to it via a fiber optic conductor in accordance with the position of the component. In one illustrated species, this means is a pair of spaced mirrors each having a different dichroic filter. In another species, this means is a pair of spaced mirrors having different degrees of reflectivity.

The same fiber optic conductor transmits the light from its source to the optical switch and returns the reflect signal to a processor or indicating means via a suitable detector. If no light signal is received at the processor it is an indication that a break has occurred in the optical system.

Accordingly, the optical transmission system has a built-in test to indicate the integrity of the system continuity.

STATEMENT OF THE OBJECTS OF THE INVENTION

An important object of this invention is to provide a mechanical position information sensing system that is passive in operation, relying on optical light transmission.

Another important object is to provide such a sensing system with a built-in test capability for detecting the light transmitting continuity of the system and to ensure maximum reliability thereof.

Other objects, advantages and novel features of the invention will become apparent from the following detailed description of the invention when considered in conjunction with the accompanying drawings.

DESCRIPTION OF THE PREFERRED EMBODIMENT

Figures 1, 2:
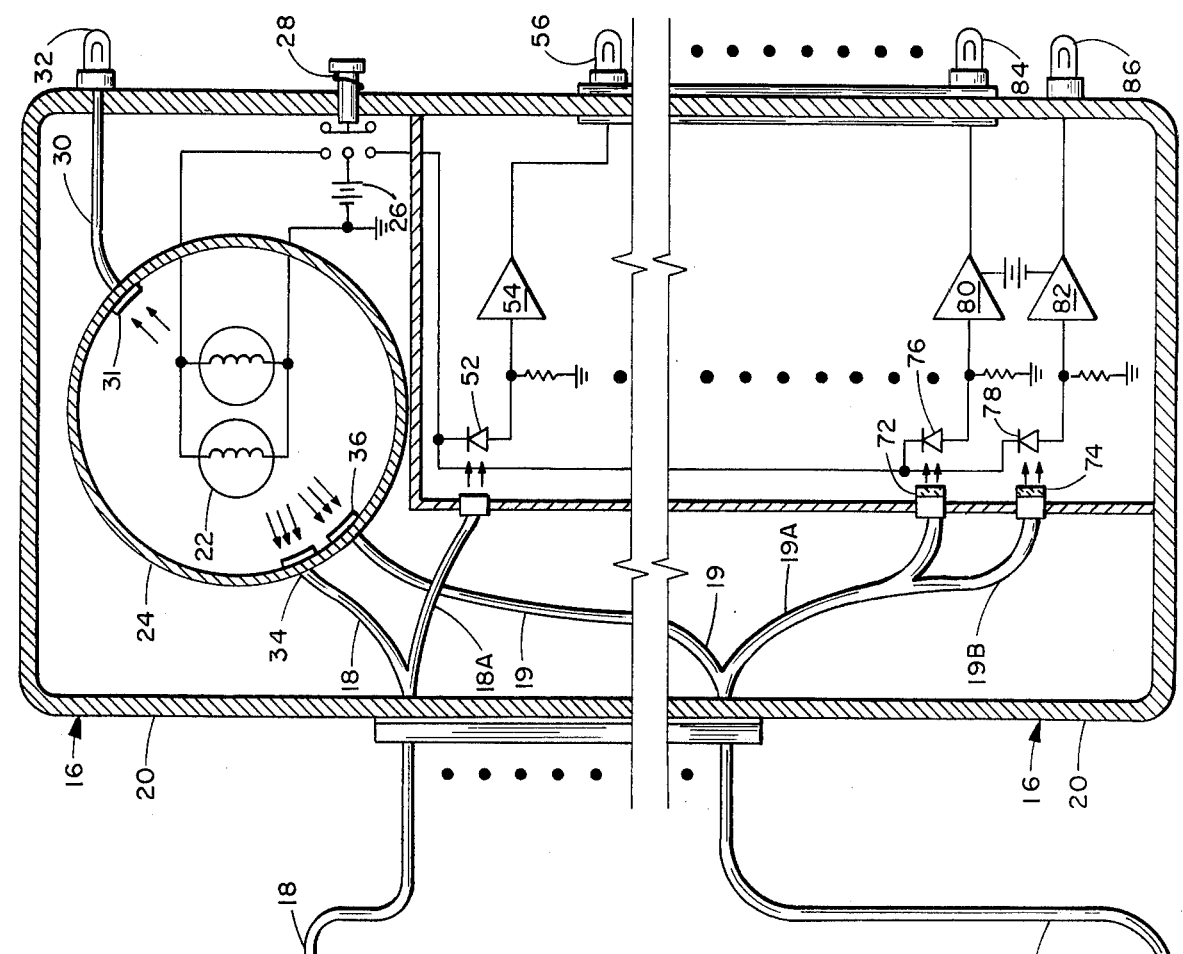
FIG. 1 is a diagrammatic general arrangement of the components of the novel mechanical position sensing apparatus showing one species of the invention.
FIG. 2 is a similar view of FIG. 1 showing a modified form of the invention.

Referring to the drawings where like reference numerals refer to similar parts throughout the figures, there is shown in FIGS. 1 and 2 a diagrammatic general arrangement view of the mechanical position sensing apparatus 10 that may be utilized in an aircraft system of the like. Sensing apparatus comprises essentialy one or more optical switches, i.e., 12 and 14 positioned adjacent the remotely located devices or objects; the mechanical position of which are to be sensed; an optical processor 16 located at the observer's station, i.e., the aircraft cockpit; and fiber optic transmission conductors 18 and 19 passively connecting the optical switches to the processor. Conductors 18 and 19 can each be composed of spatially redundant optical fibers of conventional fabrication.

A significant feature of this invention is the employment of a passive transmission system to sense the mechanical position of an object in an electrical interference sensitive environment, such as in an aircraft, being immune to the various forms of electrical interferences and associated problems.

Optical processor 16 consists of a cabinet 20 in which is located a light source 22 enclosed within a light-tight cavity 24. Light source 22 is energized by a 5-volt DC battery 26 through an ON/OFF switch 28 located at the front of the cabinet. A fiber optic cable 30 extends from cavity 24 at juncture 31 to a "press-to-test" lens indicator or lamp 32 located on the outside of cabinet 20 to provide a visual indication when the light source is energized. This monitor comprises one of the built-in test features provided in the novel sensing apparatus of this invention.

Fiber optic transmission conductors 18 and 19 are optically connected at junctions 34 and 36 to light source cavity 24, a portion of each conductor being furcated to provide branches 18a and 19a, 19b, respectively, being return paths to processor 16 for the reflected light from the various optical switches that may be incorporated in the apparatus.

Figure 3:
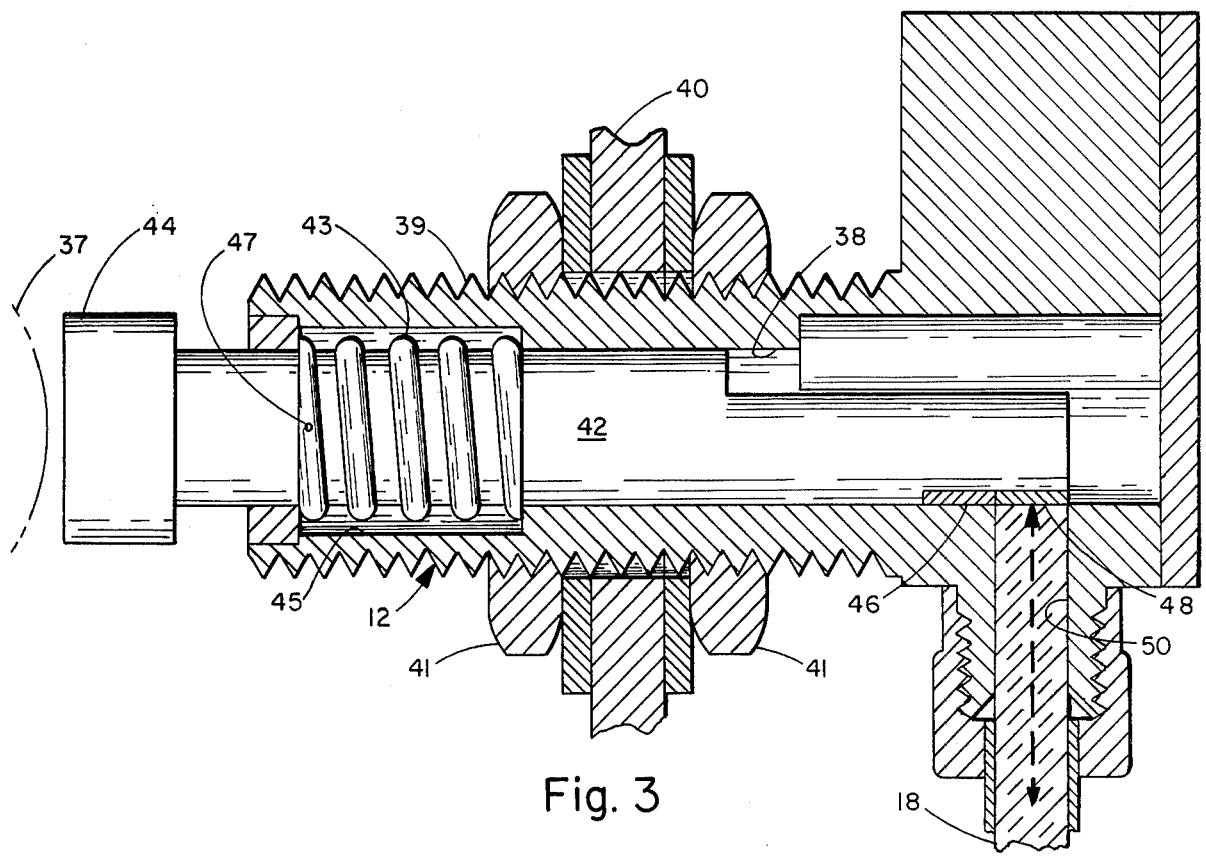
FIG. 3 is an enlarged longitudinal cross-sectional view of the optical switch of FIG. 1.

Optical switch 12 is illustrated operatively associated with a device, i.e., an aircraft wing strut 37. As shown in FIG. 3 optical switch 12 comprises a cylinder 38 having external threads 39 for adjustable support to a mounting plate 40, being secured in the adjusted position by lock nuts 41. A piston 42 is slidably supported in cylinder 38, one end of the piston being formed with a cam pad 44 positioned in the path of strut 37 for actuation, i.e., when the wings are in a fully "wing DOWN" position. A coil spring 43 is housed in cylinder recess 45, and is anchored to piston 42 by a pin 47 to bias the piston in an uppermost position, which can represent a "wing UP" position. Optical switch 12 is adjustable with respect to its support through threaded connection 39 to enable adjustment of the optical threshold to measure correctly the positive displacement condition of the cam pad 44 caused by the mechanical position being sensed. On the opposite end of piston 42 is mounted a pair of laterally spaced reflecting surfaces 46 and 48, arranged by the reciprocal movement of the piston to be alternately exposed to the light rays transmitted via fiber optic conductor 18 through opening 50 in cylinder 38. Reflecting surfaces 46 and 48 are provided with different degrees of reflectivity, for example, reflecting surface 46 can be a highly polished surface representing the "wing UP" position, while reflecting surface 48 can be a dull surface to represent the "wing DOWN" position.

The light signals for the respective positions of the wing, as represented by the two different degrees of reflected light, are transmitted back through cable 18 where they are by-passed into branch cable 18a to illuminate a photo diode 52, the output signal being amplified at 54 for displaying at indicator light 56, or otherwise processed.

Accordingly, a single fiber optic cable 18 or 19 can provide both the transmitting and receiving channels for the incident and reflected light signals.

The operator at processor 16 can determine by the intensity of the reflected light signal the relative position of the wing. As some light will be transmitted in both positions of the wing, the total absence of any reflected light signal is an indication that a break has occured somewhere in the length of fiber optic cable 18 or in an associated connector. That is, assuming lens indicator 32 is lit indicating that the lamp is energized. This is another important built-in test feature of the present invention.

Figure 4:
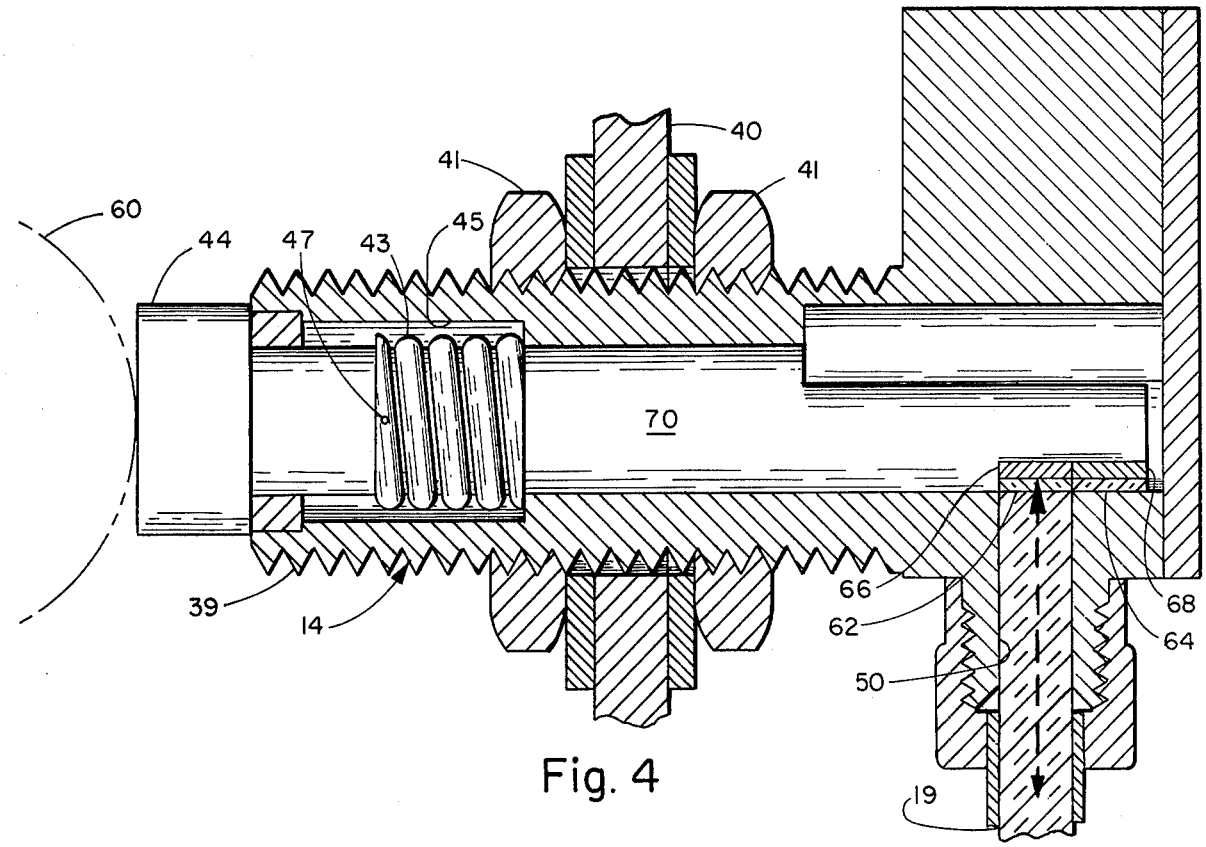
FIG. 4 is a similar view of FIG. 3 showing the optical switch of FIG. 2.

Another version of the invention is shown in FIGS. 2 and 4, the modification primarily residing in providing a different means for reflecting the light signal in optical switch 14 back to processor 16. In this example, the mechanical device being sensed may be a landing gear member 60. The optical switch 14 can be identical to optical switch 12 differing only in the manner of changing the degree of light reflectivity. In this case, a dichroic filter, i.e., a red filter 62 and a green color filter 64 are mounted in front of reflecting surfaces 66 and 68, respectively, of piston 70 to designate the "DOWN" or "UP" positions of landing gear component 60.

In processor 16 of FIG. 2, suitable red and green filters 72 and 74 are mounted at the terminations of respective fiber optic branch conductors 19a and 19b. Light signals passing through filters 72 and 74 are directed on respective photo diode 76 and 78, which signals are amplified at 80 and 82 and indicated at "press-to-test" lights 84 and 86, or the like. As either the green light or the red light should be lit, the absence of any light in 84 or 86 is an indication that a break has occurred in the transmission cables or associated connectors. It is obvious that non-visible light filters could be used in lieu of the visible light filters 72 and 74.

The novel position sensing and indicating system of this invention offers many advantages compared to hard wire electrical system. Being a passive system, no electrical power or grounding is required to control the operation, making it immune to the various interferences that normally are involved. In addition since no electrical circuits are utilized in the optical switches they are more easily designed to be less sensitive to larger temperature extremes. The use of a single fiber optic cable for both the transmission and return of the light signal reduces the weight, duplication and volume of the required interfaces. The return cable branches are provided only in the processor enclosure. Similarly, the use of fiber optic cables in lieu of electrical wiring enables routing of the interface through hazardous and/or environmentally severe areas where electrical wiring normally cannot be used.

Obviously many modifications and variations of the present invention are possible in the light of the above teachings. It is therefore to be understood that within the scope of the appended claims the invention may be practiced otherwise than as specifically described.

What is claimed is:

1. Apparatus for passively sensing the physical condition of a remotely located object in an electrical interference sensitive environment comprising:

an optical switch including a pressure sensitive member mechanically operable by said object alternately according to different positions of said object;

said pressure sensitive member being provided with a pair of spaced reflective surfaces, each surface having a different degree of reflectivity;

a light source;

a single optical simultaneous light transmitting and receiving conductor having one end capable of receiving light from said light source for transmission through the other end to illuminate said optical switch;

said optical conductor having a portion divided into at least two branch sections arranged so that one of said sections provides a light path from the light source to the optical switch, and one of said sections provides a return path for any reflected light from said optical switch to a processing means;

means provided for testing and indicating the light transmitting continuity of said light source and said conductor;

whereby the physical condition of said object can be determined passively at all times at a remote station without the need for the transmission of electrical energy that may be affected by electrical interference.

2. Apparatus for remotely sensing the mechanical position of an aircraft component comprising:

an optical switch including a pressure movable piston mechanically operable by said component alternately between two positions;

said piston having a reflecting surface for each of said positions;

a pair of spaced dichroic filters mounted on the reflecting surfaces on said piston, each filter having a different wavelength, corresponding to said two positions of the piston;

an enclosure containing a light source;

means in the container for indicating the energization of the light source;

a single optical simultaneous light transmitting and receiving conductor for said optical switch, one conductor end capable of receiving light from said source for transmission through the other end to illuminate alternately one of said dichroic filters;

said optical conductor in said enclosure having a portion thereof divided into three branch cables so arranged that one of said branch cables provides a light path from the light source to the filters and the other two cables provide a return path for the reflected light from said filters to a respective detector;

visual indicating means mounted on the face of said enclosure and connected to said filters;

whereby the position of said component can be determined by the wavelength of the reflected light received at the respective detector, and the absence of any reflected light indicates a discontinuity in the light transmitting properties of said conductor.

* * * * *